(12) United States Patent
Wang et al.

(10) Patent No.: US 11,545,883 B2
(45) Date of Patent: Jan. 3, 2023

(54) VEHICLE SHOCK ABSORBER CAPABLE OF GENERATING ELECTRICITY

(71) Applicant: Guangzhou Ocean Hydraulic Elements Co., Ltd, Guangzhou (CN)

(72) Inventors: Wenping Wang, Guangzhou (CN); Shaowei Wang, Guangzhou (CN)

(73) Assignee: Guangzhou Ocean Hydraulic Elements Co, , Ltd, Guangzhou (CN)

( * ) Notice: Subject to any disclaimer, the term of this patent is extended or adjusted under 35 U.S.C. 154(b) by 737 days.

(21) Appl. No.: 16/545,061

(22) Filed: Aug. 20, 2019

(65) Prior Publication Data
US 2020/0136490 A1    Apr. 30, 2020

(30) Foreign Application Priority Data
Oct. 30, 2018   (CN) .......................... 201811284393.8

(51) Int. Cl.
*H02K 35/04*      (2006.01)
*F16F 9/16*      (2006.01)
(Continued)

(52) U.S. Cl.
CPC .............. *H02K 35/04* (2013.01); *F16F 9/16* (2013.01); *F16F 9/3214* (2013.01); *F16F 9/3235* (2013.01); *F16F 13/002* (2013.01)

(58) Field of Classification Search
CPC .......... H02K 35/04; F16F 9/16; F16F 9/3235; F16F 9/3214; F16F 13/002
See application file for complete search history.

(56) References Cited

U.S. PATENT DOCUMENTS

| | | | | |
|---|---|---|---|---|
| 5,035,306 A | * | 7/1991 | Ashiba | F16F 9/46 188/282.3 |
| 5,337,560 A | * | 8/1994 | Abdelmalek | B60K 6/48 903/905 |

(Continued)

FOREIGN PATENT DOCUMENTS

| | | |
|---|---|---|
| CN | 204610676 U | 9/2015 |
| CN | 204961666 U | 1/2016 |

(Continued)

OTHER PUBLICATIONS

Chinese Patent Application No. 201811284393.8, First Office Action dated Jan. 10, 2020, 9 pages (including 5 pages English Translation).

*Primary Examiner* — Vishal R Sahni
(74) *Attorney, Agent, or Firm* — Fredrikson & Byron, P.A.

(57) ABSTRACT

The disclosure relates to the field of vehicle energy recovery devices, and particularly discloses a vehicle shock absorber capable of generating electricity which includes a shock absorber body, a piston rod and a bearing spring. The shock absorber body includes an inner cylinder and an outer cylinder, and an oil storage chamber communicated with an inner cavity of the inner cylinder is formed between the inner cylinder and the outer cylinder. Both ends of the bearing spring are respectively connected to an upper end of the piston rod and the outer cylinder. A bottom end of the piston rod is connected to a piston in sliding fit with the inner cylinder, and a coil is sealedly disposed in the piston. Opposite sides inside the oil storage chamber are each provided with a permanent magnet with an opposite magnetic pole, and the coil is connected to an electrode lead.

11 Claims, 2 Drawing Sheets

(51) Int. Cl.
   *F16F 9/32*   (2006.01)
   *F16F 13/00*  (2006.01)

(56) References Cited

U.S. PATENT DOCUMENTS

| | | | | |
|---|---|---|---|---|
| 6,053,291 | A * | 4/2000 | Shibahata | F16F 7/09 |
| | | | | 267/196 |
| 7,994,648 | B1 * | 8/2011 | Fielek | B60K 25/10 |
| | | | | 290/1 R |
| 2002/0139624 | A1 * | 10/2002 | Jensen | F16F 9/535 |
| | | | | 188/267.2 |
| 2005/0034941 | A1 * | 2/2005 | Tsukamoto | F16F 9/32 |
| | | | | 188/267 |
| 2011/0160960 | A1 * | 6/2011 | Kajino | B60G 17/025 |
| | | | | 701/38 |
| 2012/0031719 | A1 * | 2/2012 | Liao | F16F 9/53 |
| | | | | 188/267.2 |
| 2015/0285326 | A1 * | 10/2015 | Battlogg | B60N 2/501 |
| | | | | 188/267.2 |
| 2018/0001728 | A1 * | 1/2018 | Conti | H02K 35/02 |
| 2020/0136490 | A1 * | 4/2020 | Wang | F16F 9/3214 |

FOREIGN PATENT DOCUMENTS

| | | | | |
|---|---|---|---|---|
| CN | 106286685 | A | | 1/2017 |
| CN | 107202089 | U | | 9/2017 |
| CN | 207554681 | U | | 6/2018 |
| CN | 108518444 | A * | 9/2018 | ............ F16F 9/19 |
| DE | 102016220722 | A1 * | 4/2018 | ............ F16F 9/10 |
| GB | 2520646 | A * | 5/2015 | ........... B60G 13/14 |
| JP | 2012202529 | A * | 10/2012 | |
| JP | 2012207690 | A * | 10/2012 | |
| JP | 2015081639 | A * | 4/2015 | |
| JP | 5848505 | B2 * | 1/2016 | |
| KR | 100696952 | B1 | | 3/2007 |
| WO | 2018180363 | A1 | | 10/2018 |

* cited by examiner

VEHICLE SHOCK ABSORBER CAPABLE OF GENERATING ELECTRICITY

RELATED APPLICATIONS

This application claims priority from Chinese Patent Application No. 201811284393.8, filed Oct. 30, 2018, the entire contents of which are incorporated herein by reference.

FIELD

The disclosure relates to the technical field of vehicle energy recovery devices, and in particular, to a vehicle shock absorber capable of generating electricity.

BACKGROUND

At present, urban air pollution is very serious, and automobile exhaust emissions are the main cause of air pollution. Studying zero emission and less emissions of automobiles has become a major issue to solve urban environmental protection problems. The development of electric vehicles is one of the effective measures to solve the problem of air pollution. In recent years, with the continuous development of science and technology, various types of electric vehicles have emerged one after another, but most of them are in a state of embarrassment because of the unsatisfactory endurance mileage, incomplete charging facilities, long charging time and high battery replacement cost. The main problem is that due to the limitation of battery technology, the endurance mileage of electric vehicles is short, and energy cannot be replenished in time during long-distance driving, which are the main considerations of some users when choosing whether to purchase electric vehicles, resulting in that electric vehicles still cannot be popularized in a large range at this stage.

On the other hand, during the driving of the vehicle, wheels will vibrate due to the contact with the ground. Therefore, it is necessary to provide a shock absorber to suppress the shock when the spring is rebounded after shock absorption and the impact from the road surface, so as to improve the driving comfort of the vehicle, thereby improving the comfort of the driver and passengers. However, the existing vehicle shock absorber uses the damping effect of hydraulic oil to consume vibration energy, cannot achieve the recovery and reuse of the vibration energy, and cannot convert this part of energy into the energy of the electric vehicle.

SUMMARY

In order to solve the above problems in the background, an objective of the disclosure is to provide a vehicle shock absorber capable of generating electricity, which enables a vehicle to be supplemented with electric energy during driving without additionally increasing the energy costs.

On this basis, the disclosure provides a vehicle shock absorber capable of generating electricity, including:
a shock absorber body, comprising:
an inner cylinder,
an outer cylinder, and
an oil storage chamber formed between the inner cylinder and the outer cylinder and communicated with an inner cavity of the inner cylinder, wherein the oil storage chamber is internally provided at opposite sides with a permanent magnet with an opposite magnetic pole,
a piston in sliding fit with the inner cylinder, wherein a coil connected to an electrode lead is sealedly disposed in the piston, and
a piston rod with a bottom end connected to the piston, and
a bearing spring with both ends respectively connected to an upper end of the piston rod and the outer cylinder.

As a preferred solution, the piston rod is hollow, and the electrode lead passes through a through hole of the piston rod and is electrically connected to a battery of an electric vehicle.

As a preferred solution, a top end of the shock absorber body is sealedly covered with an upper end cover, and a bottom end of the inner cylinder is provided with a base for blocking the bottom end of the inner cylinder; the base is provided with a plurality of orifices; an upper portion of the inner cylinder is provided with an oil hole, and the inner cavity of the inner cylinder is communicated with the oil storage chamber through the orifice and the oil hole.

As a preferred solution, a valve rod is inserted in the base, and an elastic valve slice covering the orifice is mounted at one end of the valve rod towards the inside of the inner cylinder; and the other end of the valve rod is sleeved with a reset spring.

As a preferred solution, a guide ring in sliding fit with the piston rod is disposed in the upper end cover; a dust ring and a seal ring are disposed between the upper end cover and the piston rod, and a seal ring is disposed between the upper end cover and the outer cylinder.

As a preferred solution, a plurality of sets of the coils arranged in parallel are sealedly disposed in the piston, and the coils use a silicon steel sheet as a framework.

As a preferred solution, the piston is provided with a seal ring at both ends.

As a preferred solution, the bottom end of the inner cylinder is provided with a notch for mounting the permanent magnet, and the inner cylinder is further sleeved with a fixing ring for fixing an upper end of the permanent magnet; and a height of the permanent magnet is greater than a stroke of the piston.

As a preferred solution, a lower spring seat is disposed on an outer side of the outer cylinder, an upper spring seat is disposed at the upper end of the piston rod, and the bearing spring is connected between the upper spring seat and the lower spring seat.

As a preferred solution, the upper end of the piston rod is further provided with an upper lug ring, a bottom end of the outer cylinder is provided with a lower lug ring, and the upper lug ring and the lower lug ring are respectively connected to a frame of the electric vehicle.

Compared with the prior art, the disclosure has the following beneficial effects.

The vehicle shock absorber capable of generating electricity according to the disclosure includes a shock absorber body, a piston rod and a bearing spring. The shock absorber body includes an inner cylinder and an outer cylinder, and an oil storage chamber communicated with an inner cavity of the inner cylinder is formed between the inner cylinder and the outer cylinder. The inner cylinder is a pressure chamber. A coil is sealedly disposed in a piston. Opposite sides inside the oil storage chamber are respectively provided with a permanent magnet with an opposite magnetic pole, to generate a closed magnetic field. During the driving of the vehicle, when the road surface is bumped, the piston rod and the piston reciprocate up and down, the coil mounted in the piston reciprocates up and down with the piston rod to cut magnetic lines of a pair of permanent magnets generating a magnetic field, thereby generating electric energy; that is, a permanent magnet reciprocating direct-current generator is formed, and then an electrode lead connected to the coil outputs the electric energy to a battery or a driving motor of an electric vehicle, to achieve the power supplementation of the vehicle. Therefore, the vehicle is supplemented with electric energy during driving without additionally increasing energy costs. Since the energy generated by the vibration exists throughout the driving of the vehicle, it does not require any cost to convert this energy into electric energy for driving the vehicle, and the time cost required for charging is also saved.

Figure 1:
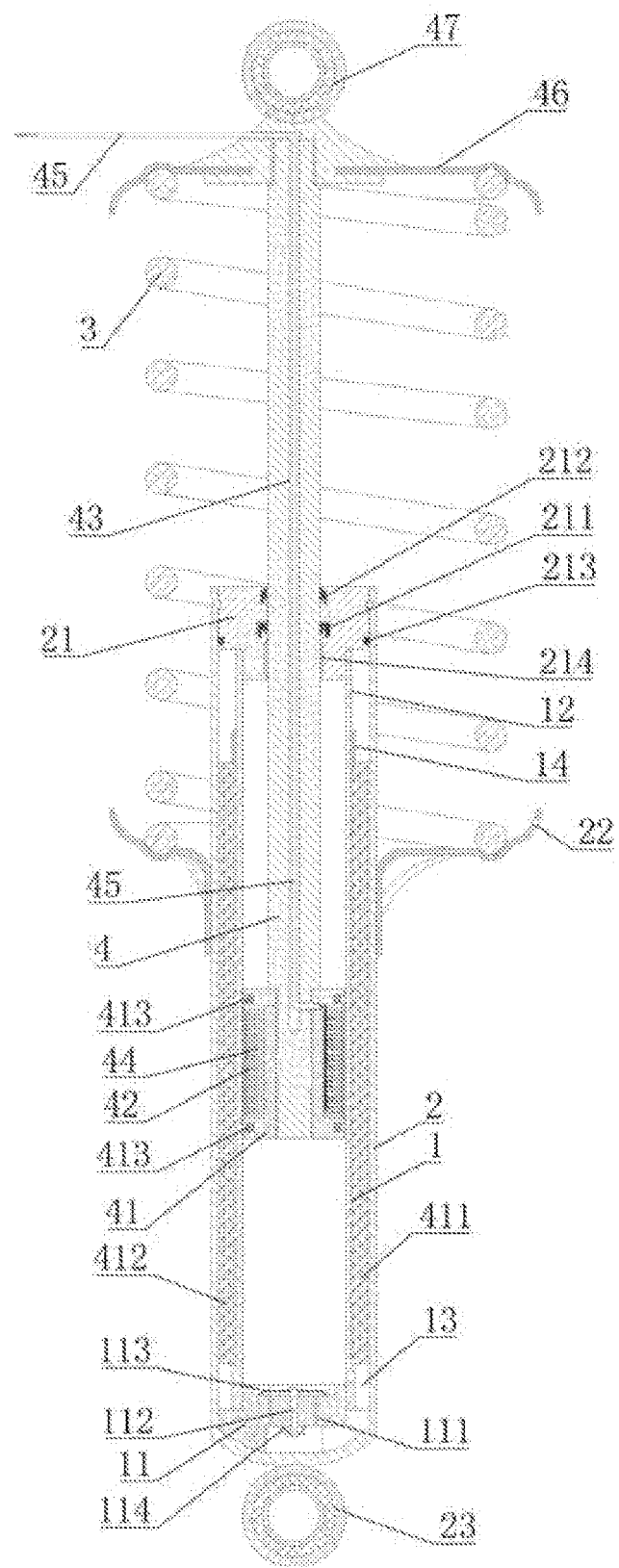
FIG. 1 is a front cross-sectional view of a vehicle shock absorber capable of generating electricity according to an embodiment of the disclosure.

In the drawings, 1. inner cylinder; 11. base; 111. orifice; 112. valve rod; 113. elastic valve slice; 114. reset spring; 12. oil hole; 13. notch; 14. fixing ring; 2. outer cylinder; 21. upper end cover; 211. seal ring with a lip; 212. dust ring with a lip; 213. O-shaped seal ring; 214. guide ring; 22. lower spring seat; 23. lower lug ring; 3. bearing spring; 4. piston rod; 41. piston; 411. first permanent magnet; 412. second permanent magnet; 413. seal ring; 42. coil; 43. through hole; 44. silicon steel sheet; 45. electrode lead; 46. upper spring seat; 47. upper lug ring.

DETAILED DESCRIPTION OF THE EMBODIMENTS

The specific embodiments of the disclosure will be further described in detail below with reference to the accompanying drawings and embodiments. The following embodiments are used to illustrate the disclosure, and are not intended to limit the scope of the disclosure.

In the description of the disclosure, it should be noted that the orientation or positional relationship indicated by the terms "center", "longitudinal", "transverse", "upper", "lower", "front", "rear", "left", "right", "vertical", "horizontal", "top", "bottom", "inside", "outside" and the like is based on the orientation or positional relationship shown in the accompanying drawings, which is merely for the convenience of describing the disclosure and simplifying the description, and is not intended to indicate or imply that the device or component involved must have a particular orientation and be constructed and operated in a particular orientation. Therefore, this should not be construed as limiting the disclosure. Moreover, the terms "first" and "second" are used for descriptive purposes only and should not be construed as indicating or implying relative importance.

Figure 2:
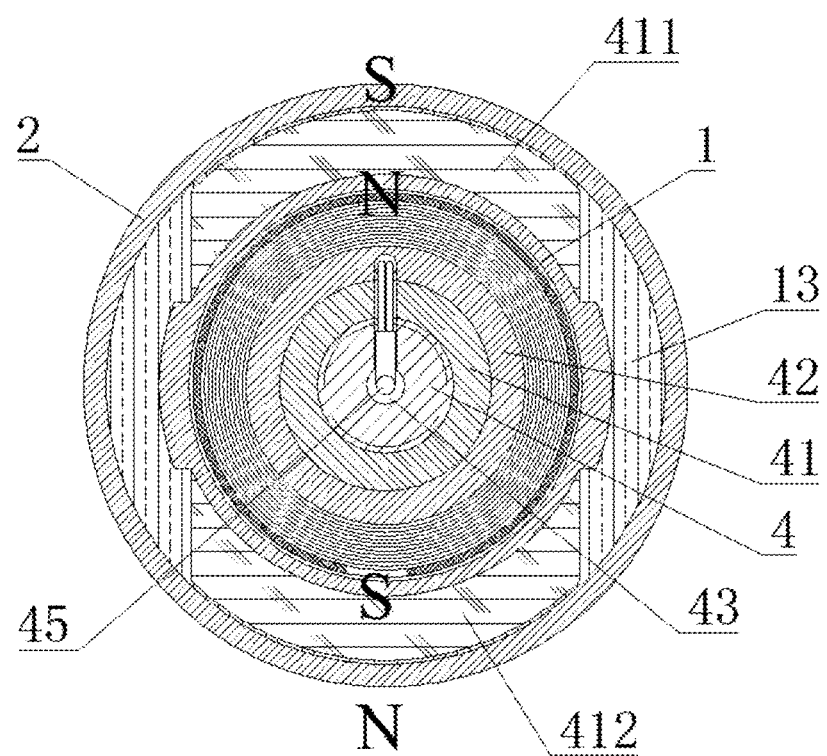
FIG. 2 is a top view of a vehicle shock absorber capable of generating electricity according to an embodiment of the disclosure.

Referring to FIGS. 1 and 2, a vehicle shock absorber capable of generating electricity according to the disclosure is schematically illustrated. The vehicle shock absorber capable of generating electricity includes a shock absorber body, a piston rod 4 and a bearing spring 3. The shock absorber body includes an inner cylinder 1 and an outer cylinder 2, and an oil storage chamber communicated with an inner cavity of the inner cylinder 1 is formed between the inner cylinder 1 and the outer cylinder 2. The inner cylinder 1 is a pressure chamber. Both ends of the bearing spring 3 are respectively connected to the upper end of the piston rod 4 and the outer cylinder 2, and the bottom end of the piston rod 4 is connected to a piston 41 in sliding fit with the inner cylinder 1. More importantly, a coil 42 is sealedly disposed in the piston 41, and opposite sides inside the oil storage chamber are respectively provided with a permanent magnet with an opposite magnetic pole, i.e., a first permanent magnet 411 and a second permanent magnet 412 (as shown in FIG. 2), respectively. The N pole of the first permanent magnet 411 is opposite to the S pole of the second permanent magnet 412, and thus a closed magnetic field is formed. Further, the coil 42 is connected to an electrode lead 45, and the electrode lead 45 is electrically connected to a battery of an electric vehicle.

After the vehicle shock damper capable of generating electricity based on the foregoing technical features is mounted on a vehicle system, the upper end of the piston rod 4 and the lower end of the outer cylinder 2 are respectively connected to a frame of the vehicle. For example, in this embodiment, a lower spring seat 22 is disposed on the other side of the outer cylinder 2, an upper spring seat 46 is disposed at the upper end of the piston rod 4, and the bearing spring 3 is connected between the upper spring seat 46 and the lower spring seat 22. The shock absorption principle is as follows. During the driving of the vehicle on the road, the piston rod 4 and the bearing spring 3 are compressed under the action of the self-weight of a vehicle body, so that the piston 41 connected to the lower end of the piston rod 4 is disposed at the middle portion of the inner cylinder 1. When wheels press a place where the road surface is raised, the wheels are jacked up, the outer cylinder 2 is compressed upwards, and the bearing spring 3 is also compressed upwards at the same time. In this case, the piston rod 41 moves towards the lower portion of the inner cylinder 1 relative to the inner cylinder 1. Meanwhile, the piston 41 compresses hydraulic oil in the inner cylinder 1, and the hydraulic oil is discharged towards the oil storage chamber through the bottom of the inner cylinder 1. Since the hydraulic oil is blocked during the discharge, a jacking force on the piston 41 is formed, which thus consumes some impact energy, thereby achieving the goal of eliminating impact of the wheels on the vehicle body, and improving the comfort of the driver and passengers. The hydraulic oil squeezed from the inner cylinder 1 enters the oil storage chamber through the bottom of the inner cylinder 1. After the oil storage chamber is full, excessive oil enters the upper portion of the piston 41 from the upper portion of the oil storage chamber. When the wheels leave the raised road surface, that is, the impact is completed, the piston rod 4 and the piston 41 are driven to move upward under the action of bearing spring 3, oil in the upper portion of the piston 41 is compressed, so that the oil enters the oil storage chamber again, and then returns to a pressure chamber at the bottom of the inner cylinder 1 to cope with the next impact. In this process, the piston 41 will reciprocate up and down to achieve the shock absorption effect on the vehicle.

The coil 42 mounted in the piston 41 reciprocates up and down with the piston rod 4 to cut magnetic lines of a pair of permanent magnets that generates a magnetic field, thereby generating electric energy, that is, a permanent magnet reciprocating direct-current generator is formed. And then an electrode lead 45 connected to the coil 42 outputs the electric energy to a battery or a driving motor of an electric vehicle, to achieve the power supplementation of the vehicle. Therefore, the vehicle is supplemented with electric energy during driving without additionally increasing energy costs. Since the energy generated by the vibration exists throughout the driving of the vehicle, it does not require any cost to convert this energy into electric energy for driving the vehicle, and the time cost required for charging is also saved. It does not need to take time to find a fixed charging pile apparatus, and in the vehicle driving process, the energy generated by the vibration is converted into electric energy that can be used for the vehicle. In addition, unlike the solar cell which is limited in structure, the vehicle shock absorber does not affect the appearance of the vehicle.

Certainly, when the electrode lead 45 is connected to the battery, it is necessary to add an inverting charging device to convert a direct current into an alternating current for the electric vehicle to use. It can be understood that the technology for implementing the inverting charging device is involved in the prior art, and details are not described herein again.

Preferably, the piston rod 4 in the foregoing embodiment has a hollow structure, that is, the piston rod 4 is provided with a through hole 43, and the electrode lead 45 passes through the through hole 43 of the piston rod 4 and then is electrically connected to a battery of an electric vehicle.

Specifically, as shown in FIG. 1, the top end of the shock absorber body is sealedly covered with an upper end cover 21, and the bottom end of the inner cylinder 1 is provided with a base 11 for blocking the bottom of the inner cylinder 1. The base 11 is provided with a plurality of orifices 111. The upper portion of the inner cylinder 1 is provided with an oil hole 12, and the inner cavity of the inner cylinder 1 is communicated with the oil storage chamber through the orifice 111 and the oil hole 12. Thus, when the piston 41 moves downward relative to the inner cylinder 1, the piston 41 compresses the hydraulic oil in the inner cylinder 1 to be discharged from the orifice 111 to the oil storage chamber, and after the oil storage chamber is full, excessive oil flows back to the upper portion of the inner cylinder 1 through the oil hole 12 at the upper portion of the inner cylinder 1. After the impact, under the action of bearing spring 3, the piston rod 4 and the piston 41 are driven to move upward to compress oil in the upper portion of the piston 41, so that the oil enters the oil storage chamber again through the oil hole 12, excessive oil of the oil storage chamber flows back to the bottom of the inner cylinder 1 from the orifice 111 of the base 11 to cope with the next impact.

Preferably, a guide ring 214 in sliding fit with the piston rod 4 is disposed in the upper end cover 21, to improve the guiding performance when the piston rod 4 moves up and down. A dust ring 212 with a lip and a seal ring 211 with a lip are disposed between the upper end cover 21 and the piston rod 4, and an O-shaped seal ring 213 is also disposed between the upper end cover 21 and the outer cylinder 2, to improve the sealing performance when the piston rod 4 moves, and prevent oil from leaking or prevent external dust from entering the pressure chamber.

As a preferred embodiment, in order to improve the damping effect of the orifice 111 to increase the shock absorbing performance of the shock absorber, the orifice 111 is internally provided with a throttle valve. When the piston 41 compresses the hydraulic oil, the discharge of the oil is blocked when the oil flows through the throttle valve, which has a jacking effect on the piston 41, thereby consuming impact energy and eliminating the impact of the wheel on the vehicle body. Specifically, a valve rod 112 is inserted in the base 11, and an elastic valve slice 113 covering the orifice 111 is mounted at one end of the valve rod 112 towards the inside of the inner cylinder 1, and the other end of the valve rod 112 is sleeved with a reset spring 114. When the piston 41 compresses the hydraulic oil, the elastic valve slice 113 is compressed at the same time, the flow cross section of the orifice 111 is reduced, and the flow velocity is lowered, thereby playing a role in throttling. The greater the pressure of the hydraulic oil on the elastic valve slice 113 is, the more the compression deformation of the elastic valve slice 113 is, the smaller the gap between the elastic valve slice 113 and the orifice 111 is, and the smaller the flow passage is, thereby playing a role in resistance adjustment and preventing a rigid impact on the vehicle body. After the impact, the piston 41 is driven to move upwards under the action of the bearing spring 3, to compress oil in the upper portion of the piston 41, so that the oil enters the oil storage chamber again through the oil hole 12, and excessive oil of the oil storage chamber pushes the elastic valve slice 113 from the lower portion of the base 11. Under the acting force of the reset spring 114, the valve rod 112 moves upwards, so that the elastic valve slice 113 is separated from the orifice 111, the gap between the elastic valve slice 113 and the orifice 111 is increased, and the flow area is increased, thereby making oil quickly return to the pressure chamber of the inner cylinder 1.

Preferably, a plurality of sets of coils 42 arranged in parallel are sealedly disposed in the piston 41, and the coils 42 use a silicon steel sheet 44 as a framework. The plurality of sets of coils 42 arranged in parallel are connected to the electrode lead 45. In order to improve the operating performance of the coil 42 and prevent hydraulic oil in the inner cylinder 1 from affecting the output conduction of the coil 42, both ends of the piston 41 are provided with a seal ring 413.

More specifically, on the basis of the foregoing structure, the bottom of the inner cylinder 1 is provided with a notch 13 for mounting the permanent magnet, and the inner cylinder 1 is further sleeved with a fixing ring 14 for fixing the upper end of the permanent magnet, and the permanent magnet is mounted and fixed in the oil storage chamber through the notch 13 and the fixing ring 14 at the bottom of the inner cylinder 1. It should be noted that the height of the permanent magnet is preferably greater than the stroke of the piston 41, that is, the closed magnetic field generated by the permanent magnet can cover the stroke range of the piston 41, so that the magnetic field can be cut to generate electric energy during the up-and-down reciprocating motion of the piston 41, thereby ensuring the continuity of electric energy output.

Further, the upper end of the piston rod 4 is further provided with an upper lug ring 47, the bottom of the outer cylinder 2 is provided with a lower lug ring 23, and the upper lug ring 47 and the lower lug ring 23 are respectively connected to a frame of the electric vehicle, so that the shock absorber is mounted on the electric vehicle.

In should be noted that the shock absorber according to the disclosure can also be applied to a passive liquid-gas hybrid shock absorber and an active liquid-gas hybrid shock absorber to adapt to different vehicles.

In summary, the vehicle shock absorber capable of generating electricity according to the disclosure converts the energy generated by the vibration into electric energy that can be used for the vehicle during the driving of the vehicle. The conversion of the energy generated by the vibration into the electric energy for driving the vehicle does not need to increase energy costs, and the time cost required for charging is also saved. It does not need to take time to find a fixed charging pile apparatus, and thus, the vehicle shock absorber capable of generating electricity has high application promotion prospects.

The above are only preferred embodiments of the disclosure, and it should be noted that those of ordinary skill in the art can make several improvements and substitutions without departing from the technical principles of the disclosure, and these improvements and substitutions should also be considered as falling within the protection scope of the disclosure.

The invention claimed is:

1. A vehicle shock absorber capable of generating electricity, comprising:
a shock absorber body, comprising:
an inner cylinder,
an outer cylinder, and
an oil storage chamber formed between the inner cylinder and the outer cylinder and communicated with an inner cavity of the inner cylinder, wherein a first circumferential outer surface of the inner cylinder is provided with a first permanent magnet and a second circumferential outer surface of the inner cylinder is provided with a second permanent magnet, and a N pole of the first permanent magnet is opposite to a S pole of the second permanent magnet,
a piston in sliding fit with the inner cylinder, wherein a coil connected to an electrode lead is sealedly disposed in the piston, and
a piston rod with a bottom end connected to the piston, and
a bearing spring with both ends respectively connected to an upper end of the piston rod and the outer cylinder.

2. The vehicle shock absorber capable of generating electricity according to claim 1, wherein the piston rod is hollow, and the electrode lead passes through a through hole of the piston rod and is electrically connected to a battery of an electric vehicle.

3. The vehicle shock absorber capable of generating electricity according to claim 1, wherein a top end of the shock absorber body is sealedly covered with an upper end cover, and a bottom end of the inner cylinder is provided with a base for blocking the bottom end of the inner cylinder; the base is provided with a plurality of orifices; an upper portion of the inner cylinder is provided with an oil hole, and the inner cavity of the inner cylinder is communicated with the oil storage chamber through the orifice plurality of orifices and the oil hole.

4. The vehicle shock absorber capable of generating electricity according to claim 3, wherein a valve rod is inserted in the base, and an elastic valve slice covering the plurality of orifices is mounted at one end of the valve rod towards inside of the inner cylinder; and the other end of the valve rod is sleeved with a reset spring.

5. The vehicle shock absorber capable of generating electricity according to claim 3, wherein a guide ring in sliding fit with the piston rod is disposed in the upper end cover; a dust ring and a seal ring are disposed between the upper end cover and the piston rod, and a seal ring is disposed between the upper end cover and the outer cylinder.

6. The vehicle shock absorber capable of generating electricity according to claim 1, wherein a plurality of sets of the coils arranged in parallel are sealedly disposed in the piston, and the coils use a silicon steel sheet as a framework.

7. The vehicle shock absorber capable of generating electricity according to claim 6, wherein the piston is provided with a seal ring at both ends.

8. The vehicle shock absorber capable of generating electricity according to claim 3, wherein the bottom end of the inner cylinder is provided with a notch for mounting the first permanent and the second permanent magnet, and the inner cylinder is further sleeved with a fixing ring for fixing upper ends of the first permanent magnet and the second permanent magnet; and heights of the first permanent magnet and the second permanent magnet are greater than a stroke of the piston.

9. The vehicle shock absorber capable of generating electricity according to claim 8, wherein a lower spring seat is disposed on an outer side of the outer cylinder, an upper spring seat is disposed at the upper end of the piston rod, and the bearing spring is connected between the upper spring seat and the lower spring seat.

10. The vehicle shock absorber capable of generating electricity according to claim 8, wherein the upper end of the piston rod is further provided with an upper lug ring, a bottom end of the outer cylinder is provided with a lower lug ring, and the upper lug ring and the lower lug ring are respectively connected to a frame of the electric vehicle.

11. The vehicle shock absorber capable of generating electricity according to claim 2, wherein an inverting charging device is provided between the electrode lead and the battery to convert a direct current into an alternating current for the electric vehicle to use.

* * * * *